US010831668B2

(12) United States Patent
Gupta et al.

(10) Patent No.: US 10,831,668 B2
(45) Date of Patent: Nov. 10, 2020

(54) DETECTION AND PREVENTION OF DEADLOCK IN A STORAGE CONTROLLER FOR CACHE ACCESS VIA A PLURALITY OF DEMOTE MECHANISMS

(71) Applicant: INTERNATIONAL BUSINESS MACHINES CORPORATION, Armonk, NY (US)

(72) Inventors: Lokesh M. Gupta, Tucson, AZ (US); Micah Robison, Tucson, AZ (US); Kyler A. Anderson, Sahuarita, AZ (US); Kevin J. Ash, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 16/118,250

(22) Filed: Aug. 30, 2018

(65) Prior Publication Data

US 2020/0073808 A1 Mar. 5, 2020

(51) Int. Cl.
*G06F 12/0855* (2016.01)
*G06F 12/123* (2016.01)
*G06F 9/48* (2006.01)

(52) U.S. Cl.
CPC ........ *G06F 12/0857* (2013.01); *G06F 9/4881* (2013.01); *G06F 12/124* (2013.01); *G06F 2212/1024* (2013.01); *G06F 2212/1044* (2013.01)

(58) Field of Classification Search
CPC .. G06F 12/0857; G06F 12/121; G06F 12/123; G06F 12/124; G06F 12/127; G06F 12/0895; G06F 9/4881; G06F 9/4887
See application file for complete search history.

(56) References Cited

U.S. PATENT DOCUMENTS

| 8,533,393 | B1* | 9/2013 | Cote | G06F 12/0804 |
| | | | | 711/118 |
| 9,798,676 | B2 | 10/2017 | Benhase et al. | |
| 9,804,971 | B2 | 10/2017 | Benhase et al. | |
| 2004/0059879 | A1* | 3/2004 | Rogers | G06F 12/0811 |
| | | | | 711/154 |
| 2004/0596879 | | 3/2004 | Rogers | |
| 2012/0303904 | A1 | 11/2012 | Ash et al. | |

(Continued)

OTHER PUBLICATIONS

Office Action dated Aug. 14, 2019, pp. 11, for U.S. Appl. No. 16/118,240.

(Continued)

*Primary Examiner* — Tracy A Warren
(74) *Attorney, Agent, or Firm* — Rabindranath Dutta; Konrad Raynes Davda & Victor LLP

(57) ABSTRACT

A computational device determines whether one or more tasks are waiting for accessing a cache for more than a predetermined amount of time while least recently used (LRU) based replacement of tracks are being performed for the cache via demotion of tracks from a LRU list of tracks corresponding to the cache. In response to determining that one or more tasks are waiting for accessing the cache for more than the predetermined amount of time, in addition to continuing to demote tracks from the LRU list, a plurality of deadlock prevention demotion tasks demote tracks from the cache.

24 Claims, 11 Drawing Sheets

(56) References Cited

U.S. PATENT DOCUMENTS

2015/0149721 A1* 5/2015 Kannan ............... G06F 12/0811
 711/122
2017/0052897 A1 2/2017 Ash et al.

OTHER PUBLICATIONS

Response dated Nov. 14, 2019, pp. 8, to Office Action dated Aug. 14, 2019, pp. 11, for U.S. Appl. No. 16/118,240.
U.S. Appl. No. 16/118,240, filed Aug. 30, 2018.
List of IBM Patents or Patent Applications Treated as Related, dated Aug. 31, 2018, pp. 2.
Notice of Allowance dated Nov. 29, 2019, pp. 7, for U.S. Appl. No. 16/118,240.

* cited by examiner

DETECTION AND PREVENTION OF DEADLOCK IN A STORAGE CONTROLLER FOR CACHE ACCESS VIA A PLURALITY OF DEMOTE MECHANISMS

BACKGROUND

1. Field

Embodiments relate to the detection and prevention of deadlock in a storage controller for cache access via plurality of demote mechanisms.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

Summary of the Preferred Embodiments

Provided are a method, system, and computer program product in which a computational device determines whether one or more tasks are waiting for accessing a cache for more than a predetermined amount of time while least recently used (LRU) based replacement of tracks are being performed for the cache via demotion of tracks from a LRU list of tracks corresponding to the cache. In response to determining that one or more tasks are waiting for accessing the cache for more than the predetermined amount of time, in addition to continuing to demote tracks from the LRU list, a plurality of deadlock prevention demotion tasks demote tracks from the cache. As a result, deadlocks are prevented in a storage controller.

In certain embodiments, the plurality of deadlock prevention demotion tasks execute in a round robin manner. As a result, a plurality of deadlock prevention demotion tasks are applied one after other for demoting tracks and preventing deadlocks.

In further embodiments, the plurality of deadlock prevention demotion tasks execute in parallel. As a result, a plurality of deadlock prevention demotion tasks are applied in parallel for demoting tracks and preventing deadlocks.

In additional embodiments, a first deadlock prevention demotion task of the plurality of deadlock prevention demotion tasks demotes tracks indicated in a cache directory that is divided into a plurality of regions, by selecting a region from which to demote tracks via a round robin mechanism. As a result, the rate of demotion of tracks is increased by demoting tracks listed in a cache directory.

In yet additional embodiments, a second deadlock prevention demotion task of the plurality of deadlock prevention demotion tasks attempts to demote tracks of the cache in a first in first out (FIFO) order. As a result, the rate of demotion of tracks is increased by demoting tracks in a FIFO order, in addition to tracks demoted from a LRU list.

In certain embodiments, a third deadlock prevention demotion task of the plurality of deadlock prevention demotion tasks attempts to demote tracks of the cache in a last in first out (LIFO) order. As a result, the rate of demotion of tracks is increased by demoting tracks in a LIFO order, in addition to tracks demoted from a LRU list.

In further embodiments, the predetermined amount of time is small enough to prevent deadlocks caused by tasks waiting to access the cache. As a result, the possibility of potential deadlocks is detected prior to the occurrence of the deadlocks.

In yet further embodiments, the plurality of deadlock prevention demotion tasks increase a rate at which tracks are demoted by executing in parallel with the demotion of tracks from the LRU list. As a result, the rate of demotion of tracks is increased.

BRIEF DESCRIPTION OF THE DRAWINGS

Referring now to the drawings in which like reference numbers represent corresponding parts throughout.

DETAILED DESCRIPTION

Figure 1:
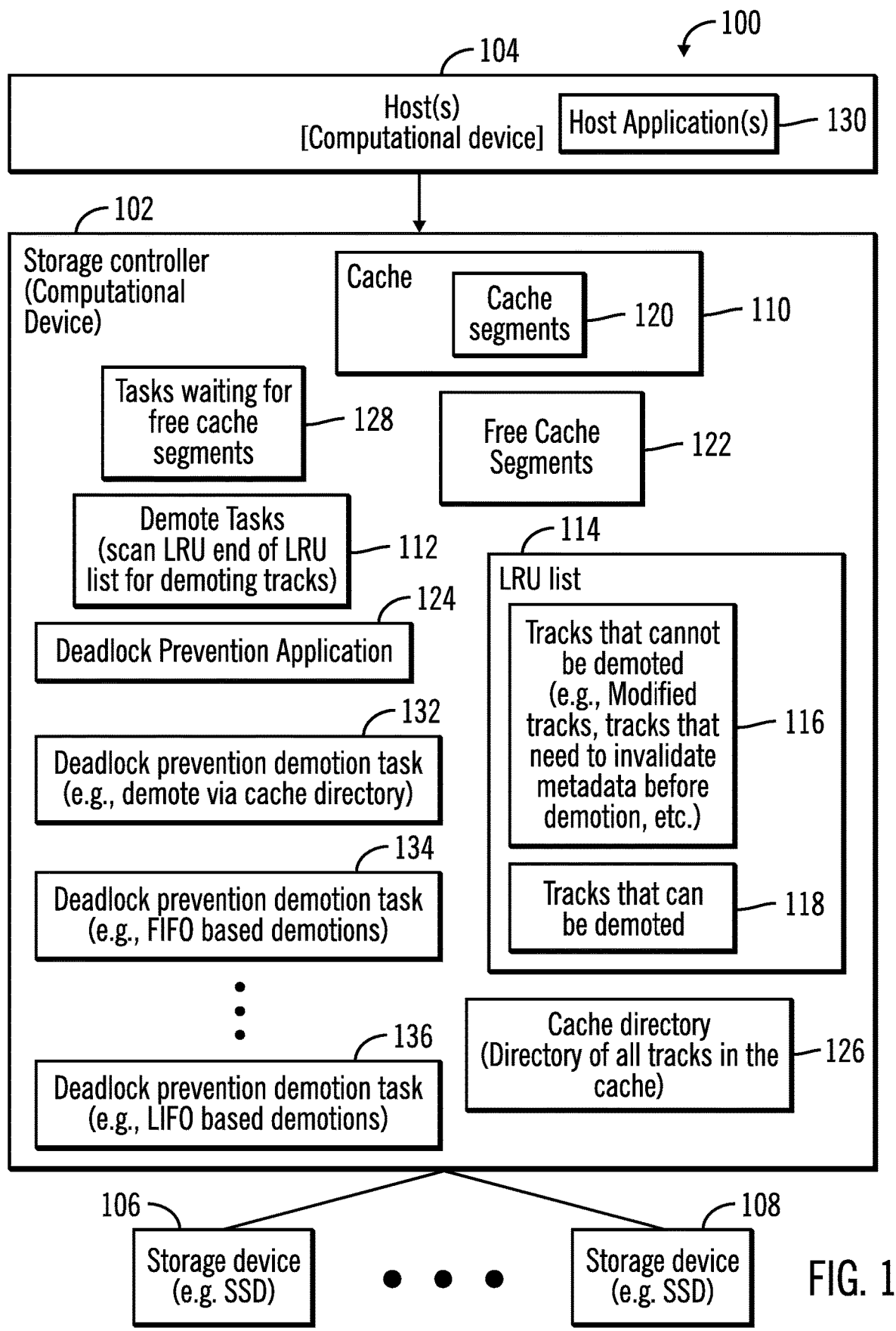
FIG. 1 illustrates a block diagram of a computing environment comprising a storage controller coupled to one or more hosts and one or more storage devices, in accordance with certain embodiments.

In the following description, reference is made to the accompanying drawings which form a part hereof and which illustrate several embodiments. It is understood that other embodiments may be utilized and structural and operational changes may be made.

A cache replacement policy in a storage controller may be LRU based. In a conventional LRU based mechanism, a track upon being accessed is added to a most recently used (MRU) end of a LRU list. As the track ages (i.e., is not used) the track moves to the LRU end of the LRU list and then gets demoted (i.e., discarded or removed) from the cache.

A storage controller may demote cache tracks from the LRU end of LRU lists. A plurality of demote tasks may scan the bottom portion (i.e., the tracks towards the LRU end) of the LRU lists to find tracks that may be demoted. However, there may be situations in which tracks from the LRU end cannot be demoted. For example, if the tracks are modified then the tracks cannot be demoted. In another example, if the tracks need to invalidate metadata prior to demotion, then the tracks cannot be demoted until the metadata has been invalidated. However, performing such operations before demotion of tracks are computationally time consuming operations, and such operations are not suitable for demote tasks because the rate of demotion may become slow. If such operations are performed by demote tasks, then the demote tasks may be not be able to demote from the LRU end of LRU lists, and a deadlock may occur while performing demotion operations via the demote tasks from the cache as there may not been a sufficient number of free cache segments for the cache.

Deadlocks may also occur while performing demotion operations, if there are errors (i.e., bugs) in the code associated with the demote tasks or other tasks that execute in the storage controller. In certain embodiments, if tasks are queuing for cache segments for more than a predetermined time period (e.g., 2 seconds) then there is a high likelihood of a deadlock. On detection of conditions where an occurrence of a deadlock is likely, a plurality of alternative demote mechanisms are performed via a round robin (or some other manner) selection mechanism in an attempt to prevent deadlocks that may occur when conventional LRU based mechanisms are used to demote tracks from a cache. Such alternative demote mechanisms may include those that attempt to demote from a cache directory and other mechanisms based on last in first out (LIFO) based demotions, first in first out (FIFO) based demotions, etc. In certain embodiments, the plurality of alternative demote mechanisms may be performed in parallel and/or in a round robin manner to prevent deadlocks when tasks are waiting for more than a predetermined time for cache segments.

Certain embodiments provide improvements to computer technology, by preventing deadlocks in cache caused by the inability of tasks to access tracks within a predetermined time period. The prevention of deadlocks is performed by integrating a plurality of alternative demotion mechanisms that execute in a round robin manner or in parallel, in addition to demoting tracks from the LRU end of the LRU list.

Exemplary Embodiments

FIG. 1 illustrates a block diagram of a computing environment 100 comprising a storage controller 102 coupled to one or more hosts 104 and one or more storage devices 106, 108, in accordance with certain embodiments.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache 110 of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The cache 110 may be any suitable cache known in the art or developed in the future. In some embodiments, the cache 110 may be implemented with a volatile memory and/or non-volatile memory. The cache 110 may store both modified and unmodified data, where one or more demote tasks 112 may periodically demote (i.e., discard) data from the cache 110 via a LRU based mechanism for demoting tracks by using a LRU list 114. In certain embodiments, the one or more applications that generate the demote tasks 112 may be implemented in software, firmware, hardware or any combination thereof.

The plurality of storage devices 106, 108 may be comprised of any storage devices known in the art. For example, the storage device 106 may be a solid state drive (SSD) and the storage device 108 may be a hard disk drive (HDD).

The LRU list 114 is a list in which identifications of tracks in the cache 110 are maintained in an order of the recency of usage of the tracks (i.e., tracks are ordered based on how recently each track has been used). The LRU list 114 may include identifications of tracks that cannot be demoted from the cache 110, and tracks that can be demoted from the cache 110 (as shown via reference numerals 116, 118). The tracks that cannot be demoted from the cache 110 may include modified tracks, tracks that need to invalidate metadata before demotion, etc.

The cache 110 stores data in a plurality of cache segments 120 comprising a plurality of tracks. A host application 130 may request an I/O operation to be performed on storage controlled by the storage controller 102 and access may be needed by to the cache 110. To generate space in the cache 110, cache segments may be demoted from the cache 110 via the demote tasks 112 from the LRU list 114, and freed cache segments (referred to as free cache segments 122) may be maintained. A queue of tasks 128 may wait for one or more free cache segments 122 to access the cache 110.

In many situations, if the rate of demotion from via the demote tasks 112 by using the LRU list 114 is not high enough, there may not be enough free cache segments 122, and one or more tasks 128 may need to wait for a prolonged period of time (e.g., more than 2 seconds) leading to slow response time for I/O operations. In certain situations, a deadlock may also occur as multiple tasks keep waiting for free cache segments. In other situations, a deadlock may also occur if there are errors in the code of the demote tasks 112 or errors in the code of one or more other tasks that execute in the storage controller 102.

In certain situations, a deadlock prevention application 124 determines whether tasks are waiting for more than a predetermined amount of time for free cache segments. If tasks are waiting for more than a predetermined amount of time for free cache segments, the deadlock prevention application 124 initiates the execution of a plurality of deadlock prevention demotion tasks 132, 134, 136 in an attempt to demote additional tracks to prevent deadlocks from occurring by generating additional free cache segments in addition to those being generated by the demote tasks 112 from the LRU list 114. As a result, the possibility of deadlock is reduced in the storage controller 102.

In FIG. 1, the deadlock prevention demotion task 132 performs demotions by using the cache directory 126. The deadlock prevention demotion task 134 may perform first in first out (FIFO) based demotions of tracks from the cache 110. The deadlock prevention demotion task 136 may perform list in first out (LIFO) based demotions of tracks from the cache 110. Other demotion mechanisms may also be used in the deadlock prevention demotions tasks 132, 134, 136.

Figure 2:
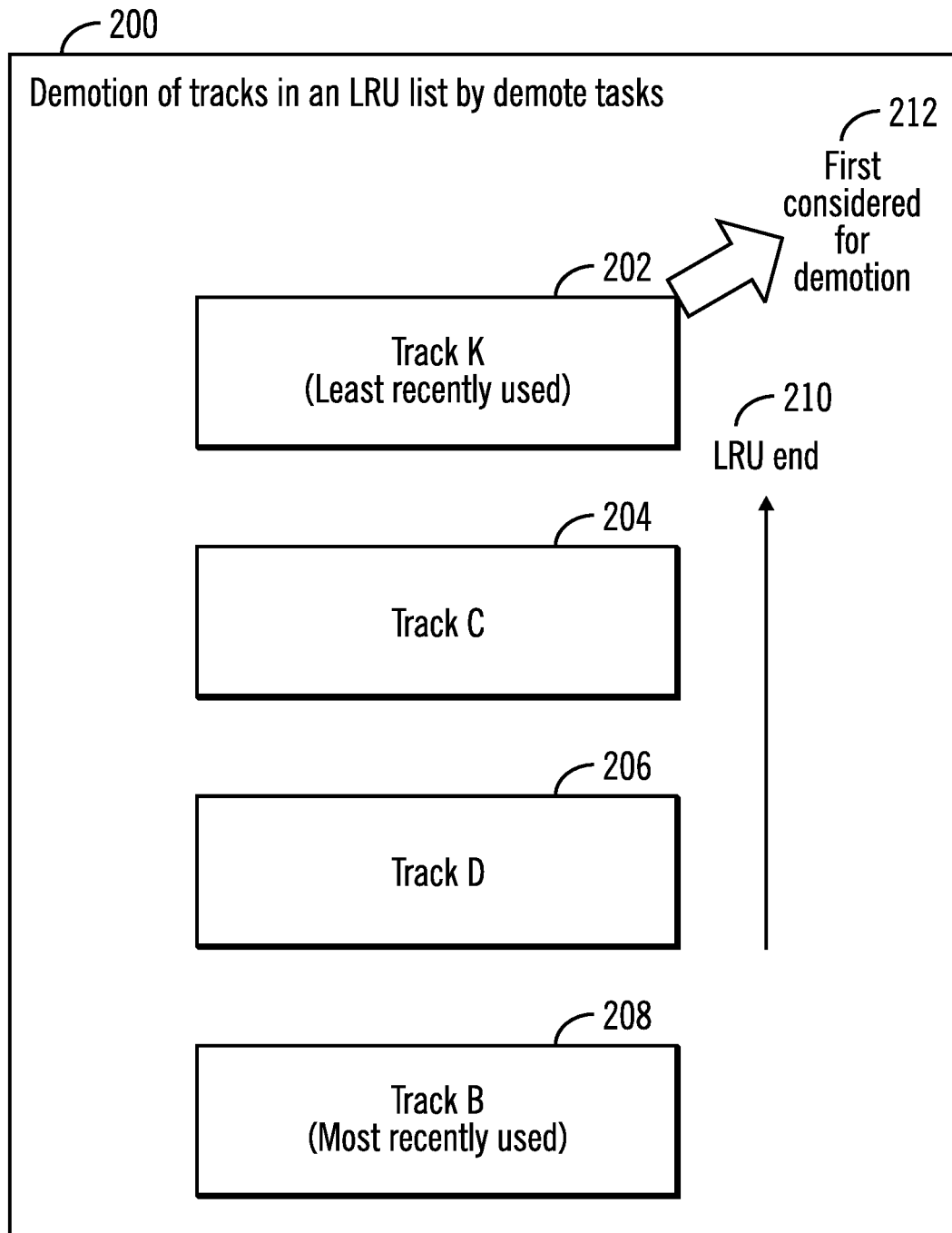
FIG. 2 illustrates a block diagram that shows demotion of tracks from an LRU list by demote tasks, in accordance with certain embodiments.

FIG. 2 illustrates a block diagram 200 that shows demotion of tracks from the LRU list 114 by demote tasks 112, in accordance with certain embodiments.

For simplicity, only four tracks, denoted as track K 202, track C 204, track D 206, and track B 208 are shown in FIG. 2, although a typical LRU list may have thousands or tens of thousands of tracks.

The LRU end of the list is shown towards the top (as shown via reference numeral 210). As a result, track K 202 is the least recently used track, and track B 208 is the most recently used track. FIG. 2 could also have been drawn to show the LRU end towards the bottom.

Track K 202 is considered for demotion first in a conventional LRU based cache replacement policy (as shown via reference numeral 212). If track K 202 is not eligible for demotion (e.g., track K 202 is a modified track that needs to be destaged from cache 110 prior to demotion) then track C 204 is considered for demotion. The demote tasks 112 consider tracks starting from the LRU end of the LRU list 114 and demotes tracks that are eligible for demotion.

In many situations the demotion of tracks via the demote tasks 112 may potentially lead to a deadlock, if enough tracks are not demoted to create an adequate number of free cache segments 122 for the waiting tasks 128.

Figure 3:
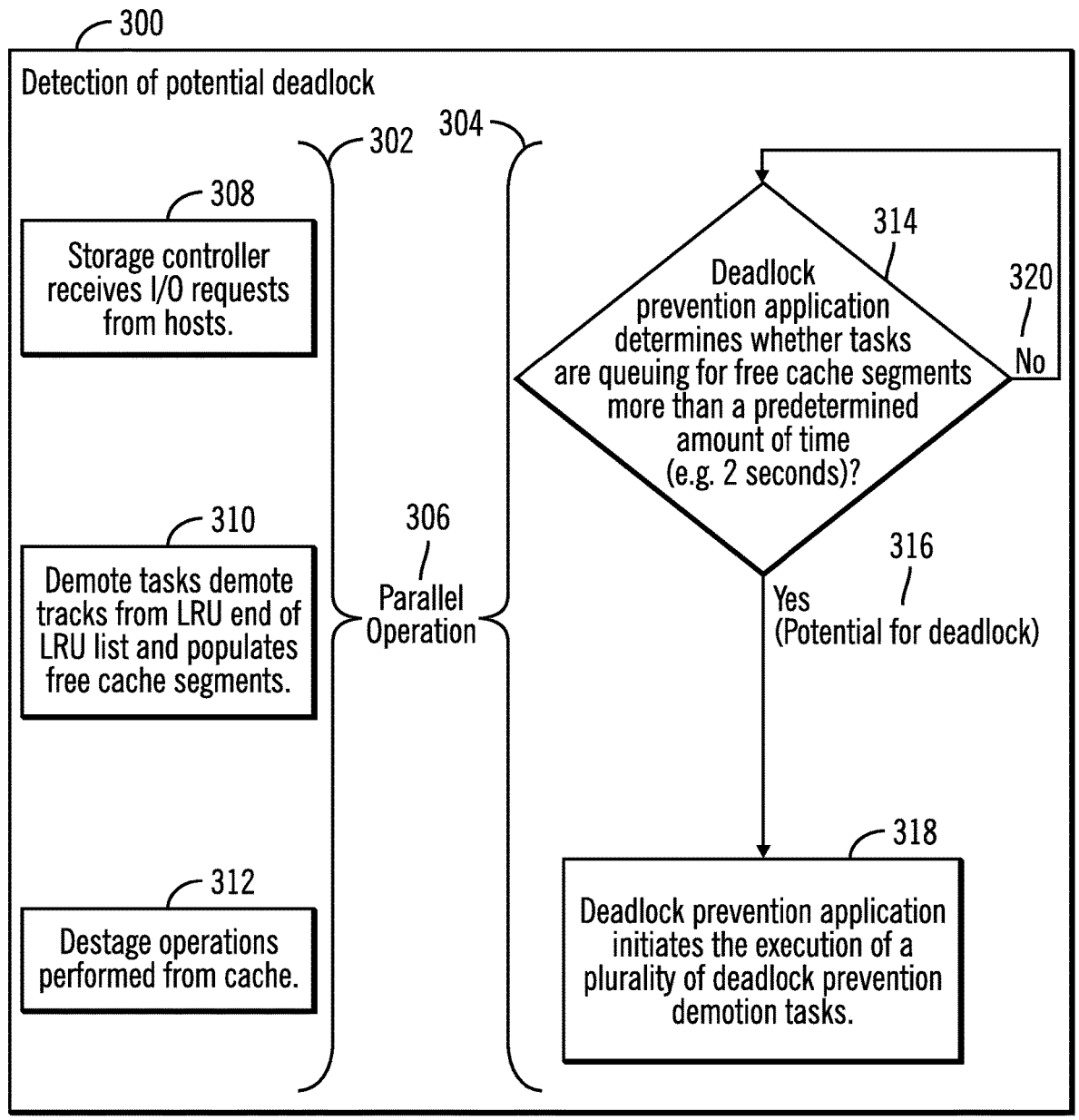
FIG. 3 illustrates a flowchart that shows detection of potential deadlock in a storage controller, in accordance with certain embodiments.

FIG. 3 illustrates a flowchart 300 that shows detection of potential deadlock in a storage controller 102, in accordance with certain embodiments.

FIG. 3 shows two sets of operations 302, 304 being performed in parallel (as shown via reference numeral 306). Operations 302 include operations 308 in which a storage controller receives I/O requests from hosts. Operations 302 also include operations 310 in which demote tasks 112 demote tracks from LRU end of the LRU list 114 and populates free cache segments. Operations 302 also include operations 312 in which destage operations are performed from the cache 110.

Operations 304 include an operation 314 in which the deadlock prevention application 124 determines whether tasks are queuing for free cache segments more than a predetermined amount of time (e.g. 2 seconds, but could be other predetermined amounts). If so ("Yes" branch 316) then there is a potential for a deadlock, and control proceeds to block 318 in which the deadlock prevention application 124 initiates the execution of a plurality of deadlock prevention demotion tasks 132, 134, 136.

As a result of demotions of tracks by the plurality of deadlock prevention demotion tasks 132, 134, 136, the rate of demotions from the cache 110 is increased beyond those provided by the demote tasks 112 via the LRU list 114 and deadlocks are prevented.

If at block 314 the deadlock prevention application 124 determines that tasks are not queuing for free cache segments more than a predetermined amount of time ("No" branch 320) then there is little or no likelihood of a deadlock and after a period of time the deadlock prevention application 124 determines that tasks are not queuing for free cache segments more than a predetermined amount of time.

As a result of the operations shown in FIG. 3, in case of a likelihood of a deadlock, demote operations performed by a plurality of deadlock prevention demotion tasks 132, 134, 136 are used concurrently with LRU based demotions, in order to increase the rate of demotions of tracks from the cache 110 and increase the rate at which free cache segments are generated and to perform demotions when code errors are preventing demotions from occurring via LRU based demotions.

Figure 4:
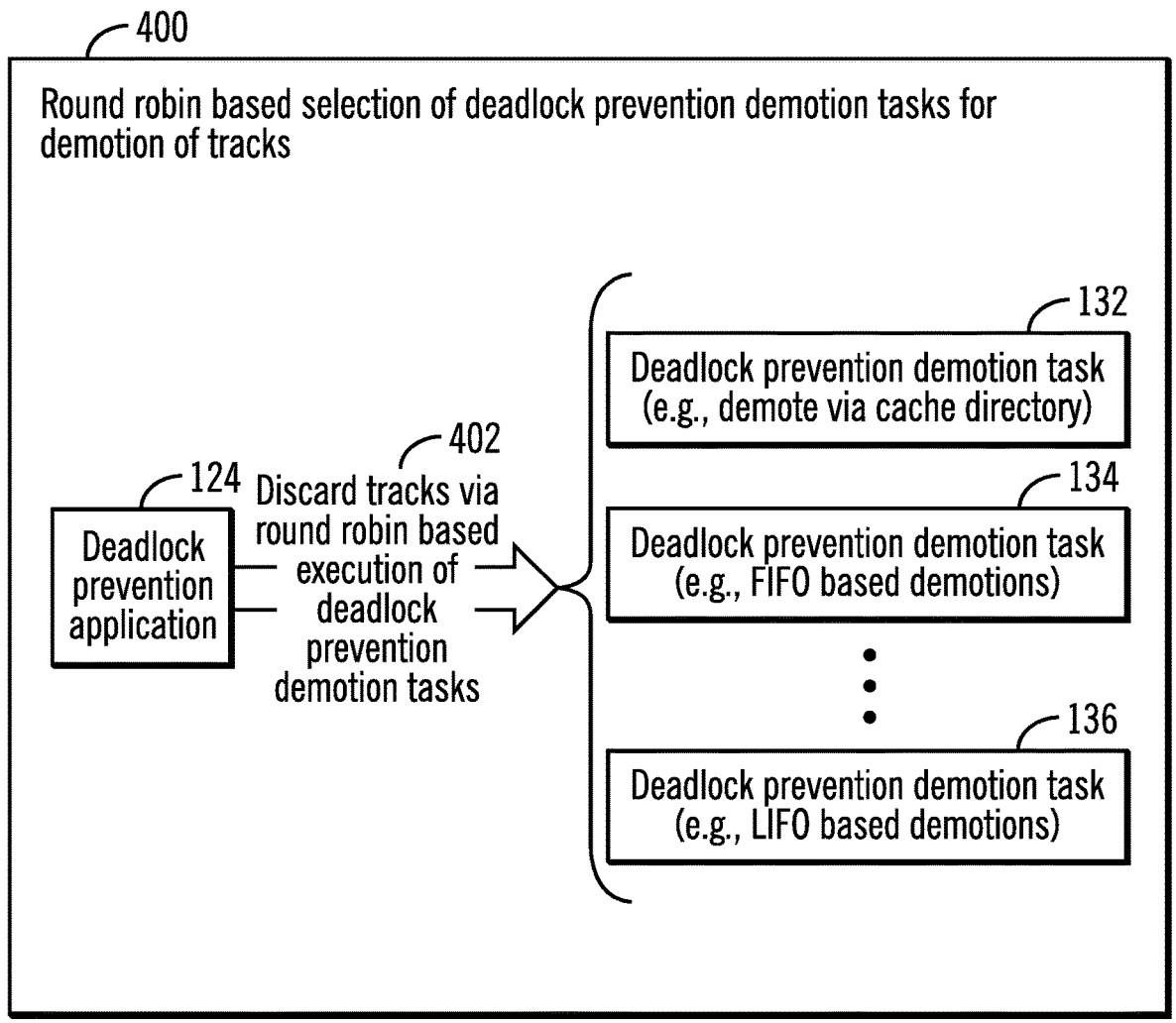
FIG. 4 illustrates a block diagram that shows round robin based selection of deadlock prevention demotion tasks for demotion of tracks, in accordance with certain embodiments.

FIG. 4 illustrates a block diagram 400 that shows round robin based selection of deadlock prevention demotion tasks for demotion of tracks, in accordance with certain embodiments.

A plurality of deadlock prevention demotion tasks 132, 134, 136 are configured to execute in the storage controller 102. The deadlock prevention application 124 manages the discarding of tracks via a round robin selection of a deadlock prevention demotion task for execution, until a sufficient number of tracks to prevent a deadlock are demoted from the cache 110 (as shown via reference numeral 402).

For example, in a round robin based selection, first tracks may be demoted by executing the deadlock prevention demotion task 132, and then tracks may be demoted by executing the demotion prevention demotion task 134, and the deadlock prevention demotion task for execution may be selected in a circular manner (i.e., after the deadlock prevention demotion task 136 has been selected for demotion of tracks, the deadlock prevention demotion task 132 is again selected for demotion of tracks). Round robin based selection can have many different variations for selection other than the circular selection mechanism described above. In alternative embodiments, other mechanisms besides round robin based selection of regions may be used for selecting regions for demotion of tracks.

Figure 5:
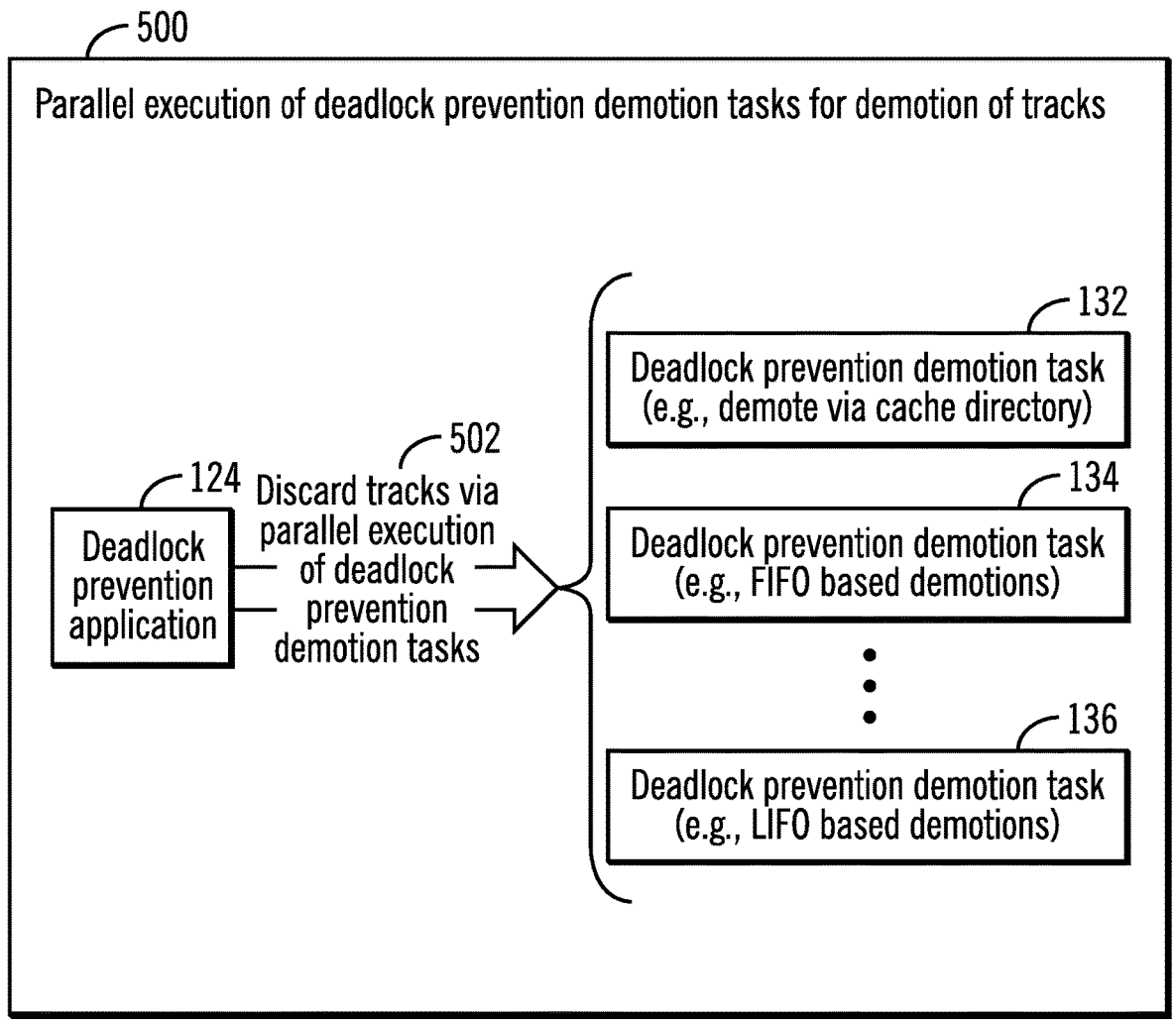
FIG. 5 illustrates a block diagram that shows parallel execution of deadlock prevention demotion tasks for demotion of tracks, in accordance with certain embodiments.

FIG. 5 illustrates a block diagram 500 that shows parallel execution of deadlock prevention demotion tasks for demotion of tracks, in accordance with certain embodiments.

A plurality of deadlock prevention demotion tasks 132, 134, 136 are configured to execute in the storage controller 102. The deadlock prevention application 124 discards tracks by initiating the parallel execution of the plurality of deadlock prevention demotion tasks 132, until a sufficient number of tracks to prevent a deadlock are demoted from the cache 110 (as shown via reference numeral 502).

In the parallel execution of the deadlock prevention demotion tasks 132, 134, 136, each of the deadlock prevention demotion tasks 132, 134, 136 may demote tracks from the cache via different mechanisms. As a result, demotion of tracks to prevent deadlock from occurring takes place.

Figure 6:
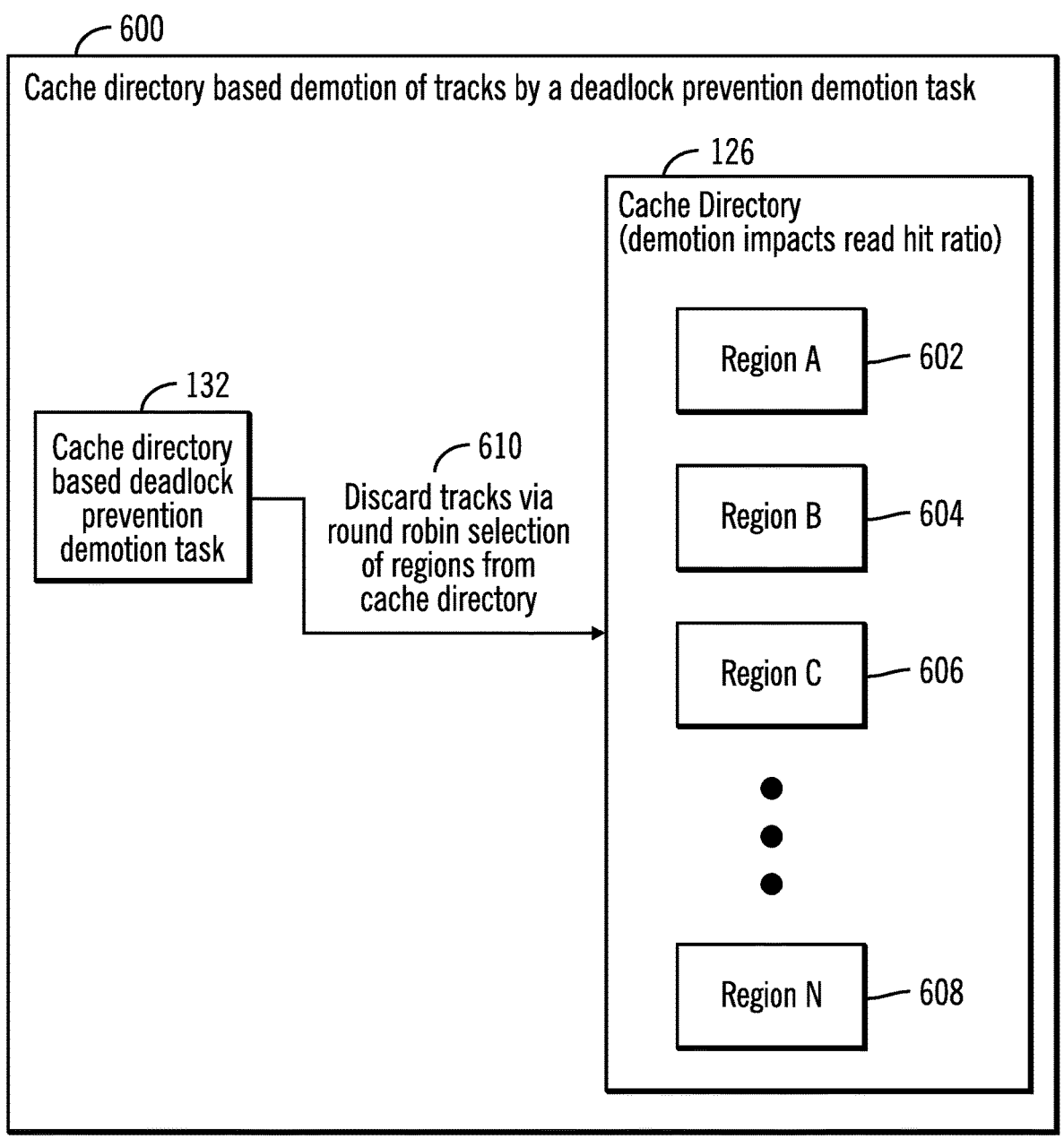
FIG. 6 illustrates a block diagram that shows a cache directory based demotion of tracks by a deadlock prevention demotion task, in accordance with certain embodiments.

FIG. 6 illustrates a block diagram 600 that shows a cache directory based demotion of tracks by a deadlock prevention demotion task 132, in accordance with certain embodiments.

The cache directory 126 is divided into a plurality of regions 602, 604, 606, 608. The cache directory based deadlock prevention demotion task 132 discards tracks via a round robin selection of a region from the plurality of regions of the cache directory 126, until a sufficient number of tracks to prevent a deadlock are demoted from the cache 110 (as shown via reference numeral 610). For example, in a round robin based selection, first tracks may be demoted from region A 602, then tracks may be demoted from region B 604, and then tracks may be demoted from region C 606, and the regions may be selected in a circular manner (i.e., after region N 608 has been selected for demotion of tracks, region A 602 is selected for demotion of tracks). Round robin based selection can have many different variations for selection other than the circular selection mechanism described above. In alternative embodiments, other mechanisms besides round robin based selection of regions may be used for selecting regions for demotion of tracks from the cache directory.

In alternative embodiments, the cache directory based deadlock prevention demotion task 132 initiates demoting of a predetermined number of tracks from a portion of the cache directory 126. For example, a portion of the cache directory 126 comprising 10% of the cache directory 126 may be used for demotion of tracks maintained in the portion. It should be noted that using larger portions of the cache directory 126 for demotions may reduce the cache hit ratio as non LRU tracks may be demoted from the cache directory 126. The cache directory based deadlock prevention demotion task 132 determines whether the portion of the cache directory 126 has "enough" tracks to be demoted, i.e., whether an adequate number of tracks enough to prevent deadlocks can be demoted from the region. If not, the cache directory based deadlock prevention demotion task 132 increases the portion (e.g. from 10% of the cache 110 to make the portion 20% of the cache 110) of the cache 110 from which tracks are to be demoted, and then tracks are demoted from the increased. As a result of controlling the portion of the cache directory used for demotion, impact on the cache hit ratio is minimized. There is impact on the cache hit ratio because the demotion of non LRU tracks is performed from the cache directory. While demoting tracks, demotion of unmodified tracks is performed first, before attempting the relatively slower operation to destage and demote modified tracks.

Figure 7:
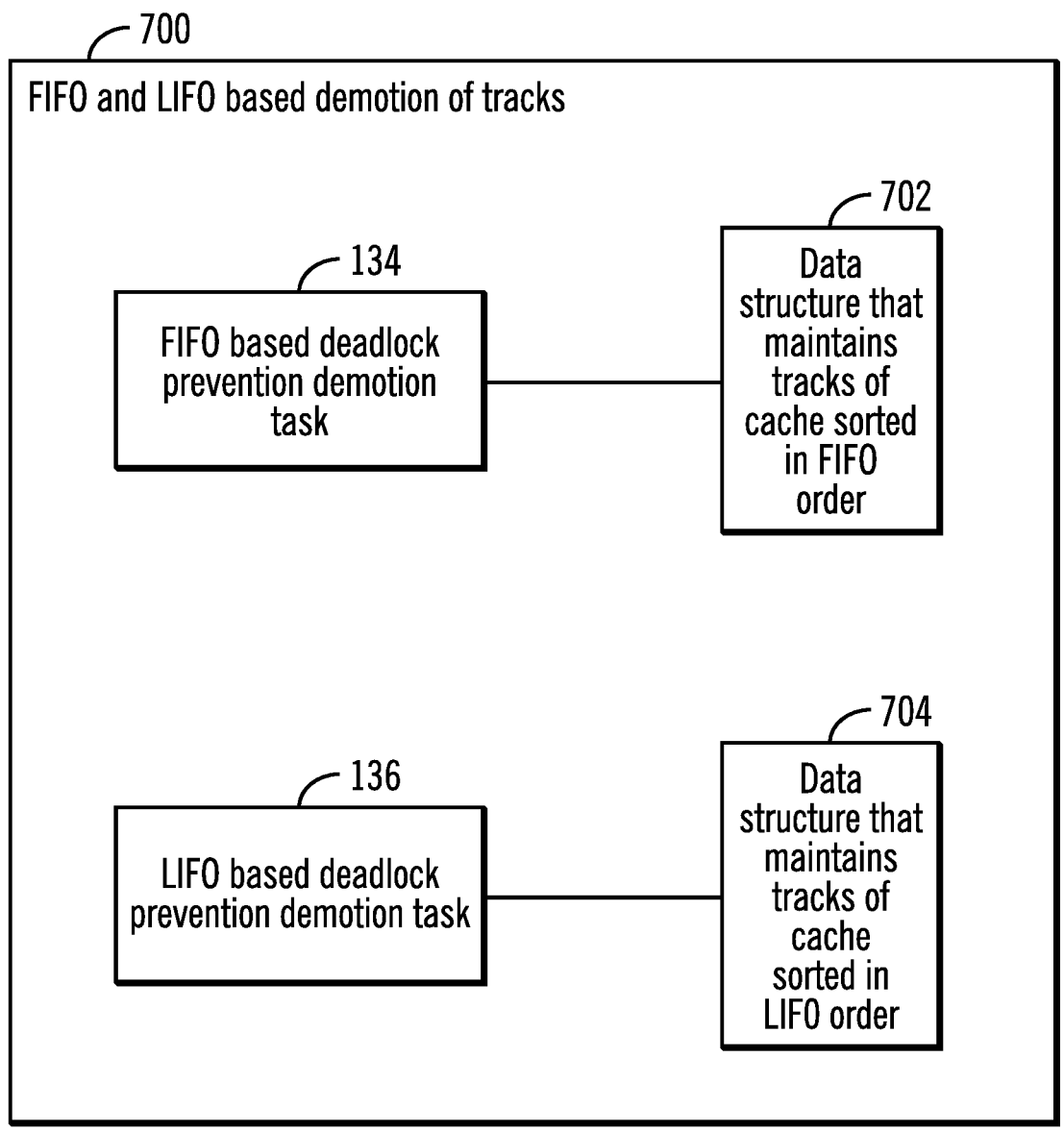
FIG. 7 illustrates a block diagram that shows first in first out (FIFO) and last in first out (LIFO) based demotion of tracks, in accordance with certain embodiments.

FIG. 7 illustrates a block diagram 700 that shows FIFO and LIFO based demotion of tracks, in accordance with certain embodiments.

A data structure 702 that maintains identifications of tracks of the cache 110 in a FIFO ordered list is maintained in the storage controller 102. Another data structure 704 that maintains identifications of tracks of the cache 110 in a LIFO ordered list is maintained in the storage controller 102. In the FIFO ordered list, a track that has been stored first in the cache 110 is at the head of the FIFO ordered list, and is examined for demotion first by the FIFO based deadlock prevention demotion task 134. In the LIFO ordered list, a track that has been stored last in the cache 110 is at the head of the LIFO ordered list, and is examined for demotion first by the LIFO based deadlock prevention demotion task 136. A track at the head of a LIFO or FIFO ordered list is demoted only if the track is an unmodified task, otherwise the next track in the LIFO or FIFO ordered list is examined to determine suitability for demotion.

Figure 8:
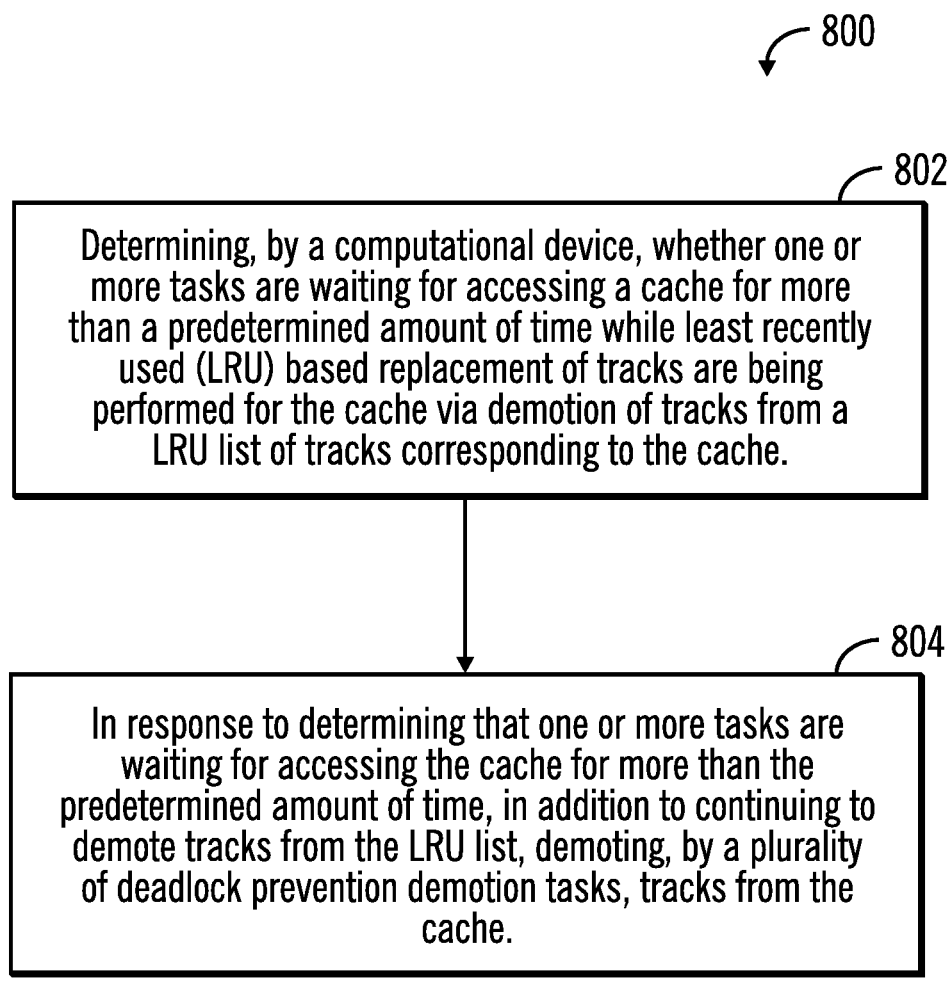
FIG. 8 illustrates a flowchart that shows the detection and prevention of deadlock in a storage controller for cache access via a plurality of demote mechanisms, in accordance with certain embodiments.

FIG. 8 illustrates a flowchart 800 that shows the detection and prevention of deadlock in a storage controller for cache access via a plurality of demote mechanisms, in accordance with certain embodiments.

A computational device (e.g. storage controller 102) determines (at block 802) whether one or more tasks 128 are waiting for accessing a cache 110 for more than a predetermined amount of time while least recently used (LRU) based replacement of tracks are being performed for the cache 110 via demotion of tracks from a LRU list 114 of tracks corresponding to the cache 110.

From block 802 control proceeds to block 804 in which in response to determining that one or more tasks are waiting for accessing the cache 110 for more than the predetermined amount of time, in addition to continuing to demote tracks from the LRU list, a plurality of deadlock prevention demotion tasks 132, 134, 136 demotes tracks from the cache 110. The plurality of deadlock prevention demotion tasks 132, 134, 136 may execute in a round robin manner on in parallel. In certain embodiments, the deadlock prevention demotion tasks 132, 134, 136 may use a cache directory for demotion of tracks, or may use a LIFO ordered or FIFO ordered demotion of tracks.

Therefore, FIGS. 1-8 illustrate certain embodiments in which if there is a likelihood of a deadlock, then a LRU based cache replacement mechanism is augmented by a plurality of deadlock prevention demotion tasks to demote additional tracks than those demoted via the LRU based cache replacement mechanism.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
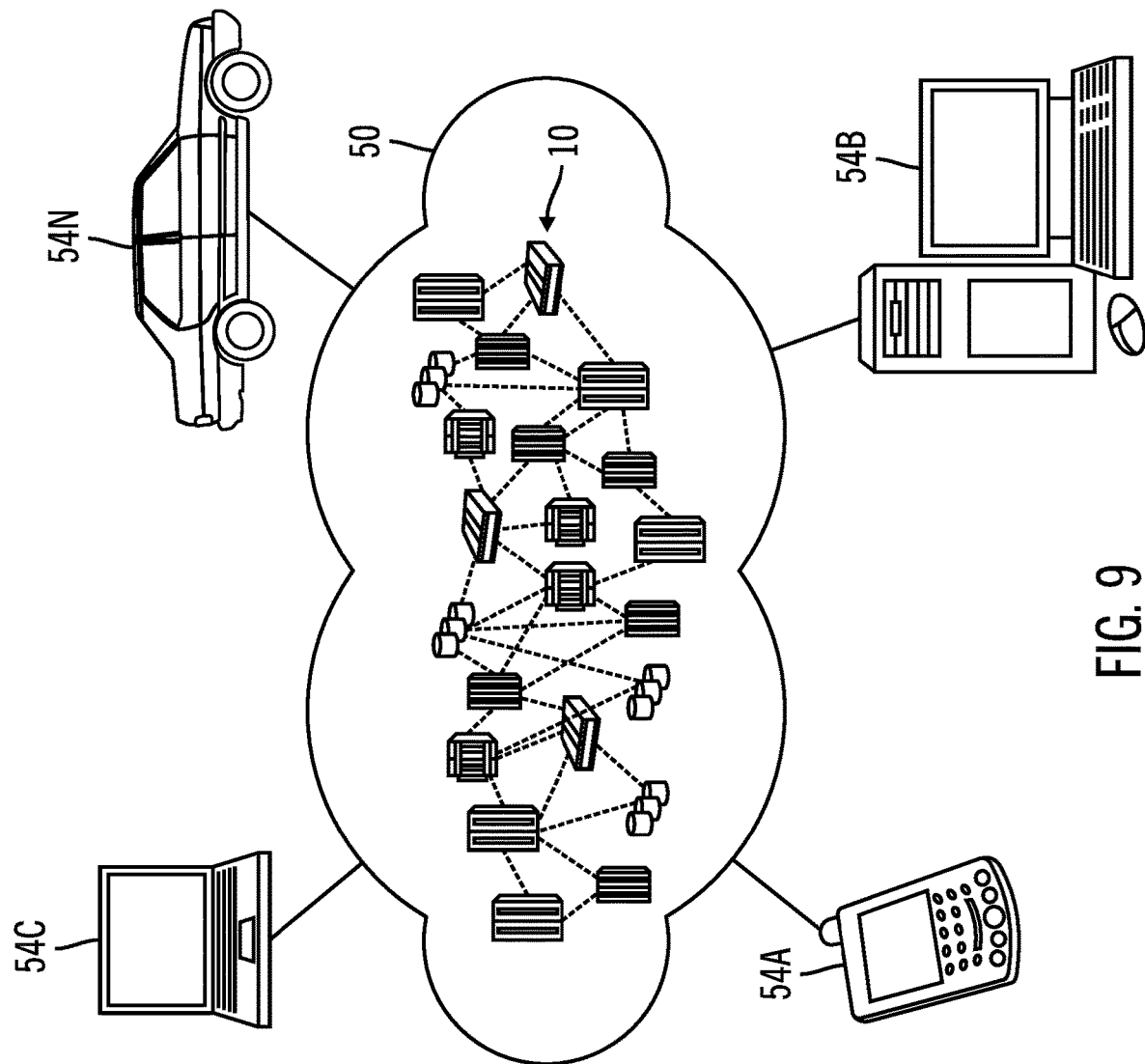
FIG. 9 illustrates a block diagram of a cloud computing environment, in accordance with certain embodiments.

Referring now to FIG. 9 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
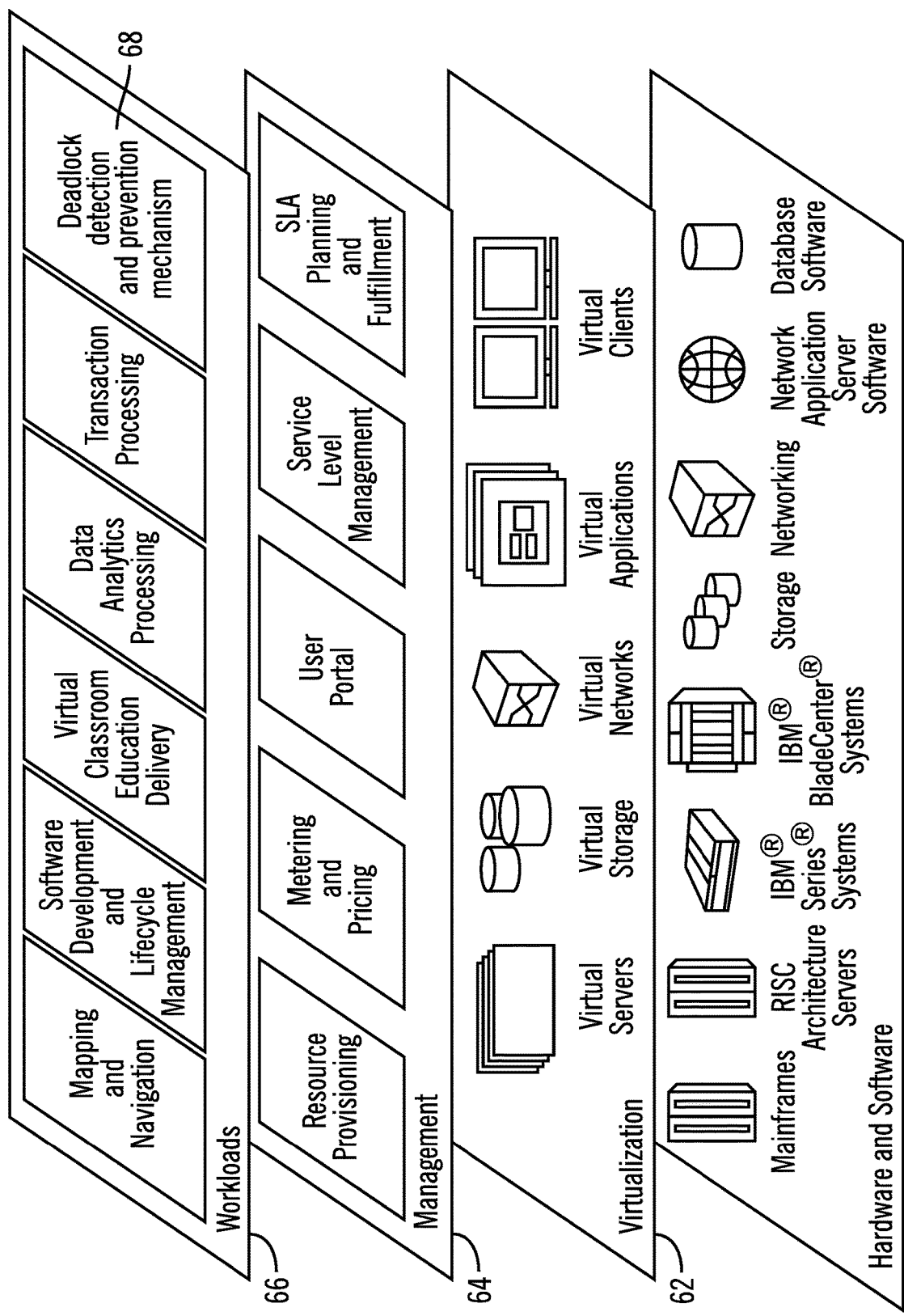
FIG. 10 illustrates a block diagram of further details of the cloud computing environment of FIG. 9 in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and deadlock detection and prevention mechanism 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
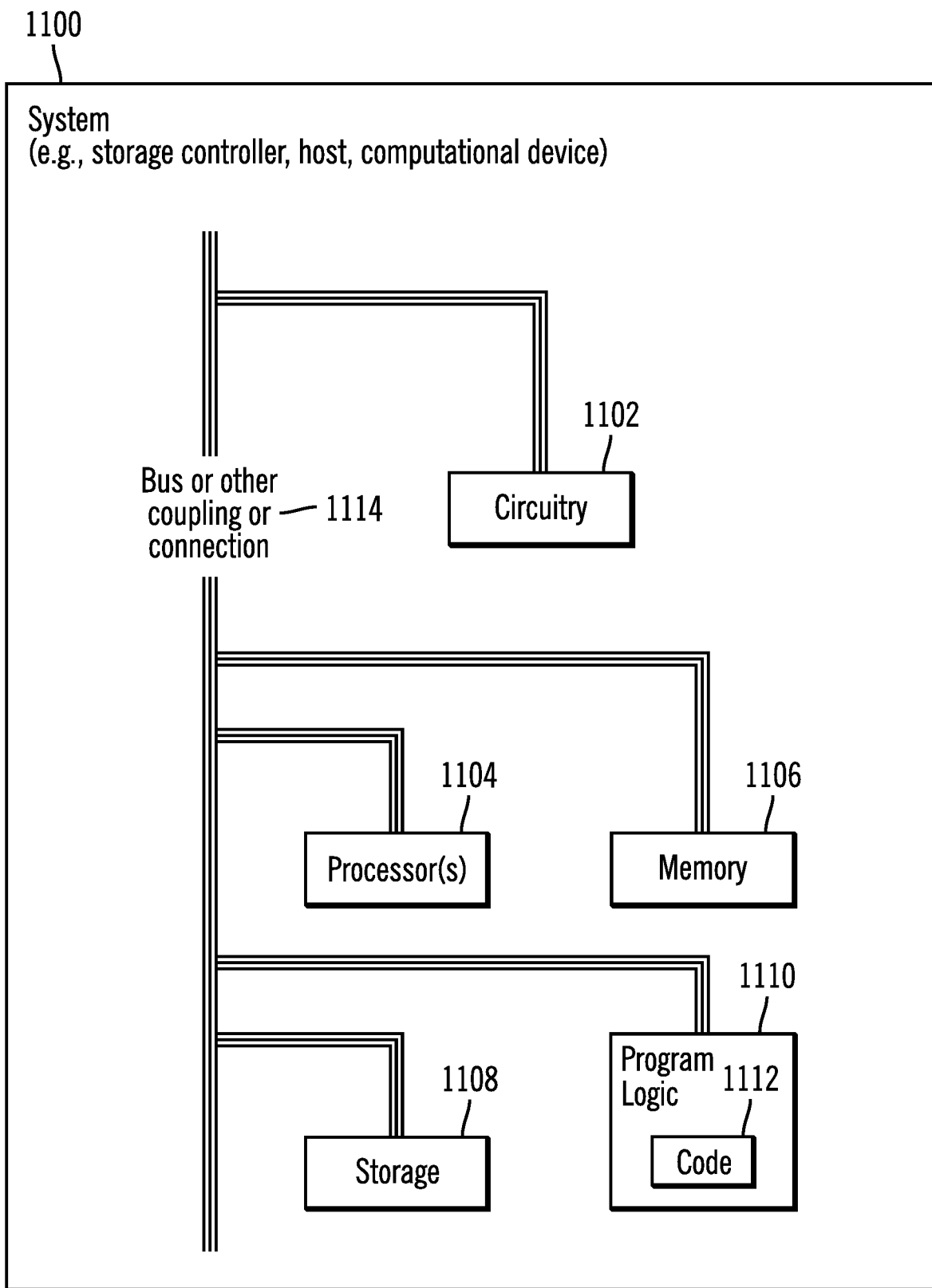
FIG. 11 illustrates a block diagram of a computational system that shows certain elements that may be included in the storage controller or the host, as described in FIG. 10, in accordance with certain embodiments.

FIG. 11 illustrates a block diagram that shows certain elements that may be included in the storage controller 102 or the host 104, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    determining, by a computational device, whether one or more tasks are waiting for accessing a cache for more than a predetermined amount of time while least recently used (LRU) based replacement of tracks are being performed for the cache via demotion of tracks from a LRU list of tracks corresponding to the cache; and
    in response to determining that one or more tasks are waiting for accessing the cache for more than the predetermined amount of time, in addition to continuing to demote tracks from the LRU list, demoting, by a plurality of deadlock prevention demotion tasks, tracks from the cache.

2. The method of claim 1, wherein the plurality of deadlock prevention demotion tasks execute in a round robin manner.

3. The method of claim 1, wherein the plurality of deadlock prevention demotion tasks execute in parallel.

4. The method of claim 1, wherein a first deadlock prevention demotion task of the plurality of deadlock prevention demotion tasks demotes tracks indicated in a cache directory that is divided into a plurality of regions, by selecting a region from which to demote tracks via a round robin mechanism.

5. The method of claim 4, wherein a second deadlock prevention demotion task of the plurality of deadlock prevention demotion tasks attempts to demote tracks of the cache in a first in first out (FIFO) order.

6. The method of claim 5, wherein a third deadlock prevention demotion task of the plurality of deadlock prevention demotion tasks attempts to demote tracks of the cache in a last in first out (LIFO) order.

7. The method claim 1, wherein the predetermined amount of time is small enough to prevent deadlocks caused by tasks waiting to access the cache.

8. The method of claim 1, wherein the plurality of deadlock prevention demotion tasks increase a rate at which tracks are demoted by executing in parallel with the demotion of tracks from the LRU list.

9. A system, comprising:
    a memory; and
    a processor coupled to the memory, wherein the processor performs operations, the operations performed by the processor comprising:
    determining whether one or more tasks are waiting for accessing a cache for more than a predetermined amount of time while least recently used (LRU) based replacement of tracks are being performed for the cache via demotion of tracks from a LRU list of tracks corresponding to the cache; and
    in response to determining that one or more tasks are waiting for accessing the cache for more than the predetermined amount of time, in addition to continuing to demote tracks from the LRU list, demoting, by a plurality of deadlock prevention demotion tasks, tracks from the cache.

10. The system of claim 9, wherein the plurality of deadlock prevention demotion tasks execute in a round robin manner.

11. The system of claim 9, wherein the plurality of deadlock prevention demotion tasks execute in parallel.

12. The system of claim 9, wherein a first deadlock prevention demotion task of the plurality of deadlock prevention demotion tasks demotes tracks indicated in a cache directory that is divided into a plurality of regions, by selecting a region from which to demote tracks via a round robin mechanism.

13. The system of claim 12, wherein a second deadlock prevention demotion task of the plurality of deadlock prevention demotion tasks attempts to demote tracks of the cache in a first in first out (FIFO) order.

14. The system of claim 13, wherein a third deadlock prevention demotion task of the plurality of deadlock prevention demotion tasks attempts to demote tracks of the cache in a last in first out (LIFO) order.

15. The system claim 9, wherein the predetermined amount of time is small enough to prevent deadlocks caused by tasks waiting to access the cache.

16. The system of claim 9, wherein the plurality of deadlock prevention demotion tasks increase a rate at which tracks are demoted by executing in parallel with the demotion of tracks from the LRU list.

17. A computer program product, the computer program product comprising a computer readable storage medium having computer readable program code embodied therewith, the computer readable program code configured to perform operations in a computational device, the operations comprising:
    determining whether one or more tasks are waiting for accessing a cache for more than a predetermined amount of time while least recently used (LRU) based replacement of tracks are being performed for the cache via demotion of tracks from a LRU list of tracks corresponding to the cache; and in response to determining that one or more tasks are waiting for accessing the cache for more than the predetermined amount of time, in addition to continuing to demote tracks from the LRU list, demoting, by a plurality of deadlock prevention demotion tasks, tracks from the cache.

18. The computer program product of claim 17, wherein the plurality of deadlock prevention demotion tasks execute in a round robin manner.

19. The computer program product of claim 17, wherein the plurality of deadlock prevention demotion tasks execute in parallel.

20. The computer program product of claim 17, wherein a first deadlock prevention demotion task of the plurality of deadlock prevention demotion tasks demotes tracks indicated in a cache directory that is divided into a plurality of regions, by selecting a region from which to demote tracks via a round robin mechanism.

21. The computer program product of claim 20, wherein a second deadlock prevention demotion task of the plurality of deadlock prevention demotion tasks attempts to demote tracks of the cache in a first in first out (FIFO) order.

22. The computer program product of claim 21, wherein a third deadlock prevention demotion task of the plurality of deadlock prevention demotion tasks attempts to demote tracks of the cache in a last in first out (LIFO) order.

23. The computer program product claim 17, wherein the predetermined amount of time is small enough to prevent deadlocks caused by tasks waiting to access the cache.

24. The computer program product of claim 17, wherein the plurality of deadlock prevention demotion tasks increase a rate at which tracks are demoted by executing in parallel with the demotion of tracks from the LRU list.

* * * * *